March 3, 1931.          C. R. SHORT          1,794,926
RESILIENT CONNECTER
Filed Jan. 21, 1925

Inventor
Charles R. Short,
By Spencer Sewall & Hardman
Attorney

Patented Mar. 3, 1931

1,794,926

UNITED STATES PATENT OFFICE

CHARLES R. SHORT, OF DAYTON, OHIO, ASSIGNOR TO GENERAL MOTORS RESEARCH CORPORATION, OF DAYTON, OHIO, A CORPORATION OF DELAWARE

RESILIENT CONNECTER

Application filed January 21, 1925. Serial No. 3,784.

This invention relates to connecters, particularly adapted to be interposed between two other members that have a slight angular movement with respect to each other.

Among its objects are to prevent wear of metal on metal in a joint between two relatively movable parts, to permit angular movement of the parts by means of a torsionally elastic element, to render lubrication unnecessary, end to prevent rattling.

The invention consists in a torsion or oscillatory connecting member comprising some elastic substance, such as rubber, so constructed and mounted between two external parts as to avoid slipping or rubbing union with both parts and permit the required relative movement between those parts to take place only through the elasticity of the rubber or other elastic substance. It further consists of an annulus of elastic material, such as rubber, the main body of which is relatively tough and elastic, while the inner and in somecases the outer layers are in whole or in part hard and relatively non-elastic, said hard layer or layers having preferably external ribs, grooves or other projections or indentations adapted to mate with corresponding grooves, ribs or the like in one or both of the parts to be connected by it or in elements rigid with and immovable with respect to those parts. It further consists of an elastic annulus of rubber or the like, connecting two external members, one at least of which is of a width less than the length of the annulus, whereby said annulus has opposite unconfined end portions of relatively soft but tough elastic material, so that the soft, tough elastic material may distort at these portions and elastically resist movement of the connected parts, axially of the annulus, toward abutments, such as the brackets or links bearing against the ends of the annulus by means of which the connecters are mounted.

In the accompanying drawings, in which like reference characters indicate like parts, throughout the several views, Fig. 1 is a side elevation showing one application of the invention constituting the subject of this application;

Figure 1:
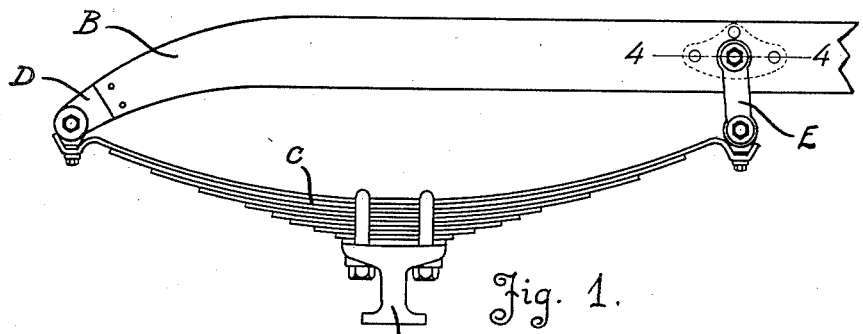

In Fig. 1, A represents a vehicle axle; B the front end of a vehicle frame sill and C a leaf spring resting upon the axle A and having its ends connected to the vehicle sill by means of connecters made according to this invention and attached by bracket D, and links or shackle E. In this figure, spring C and sill B, represent external parts to be connected directly or indirectly by the connecter.

Figure 2:
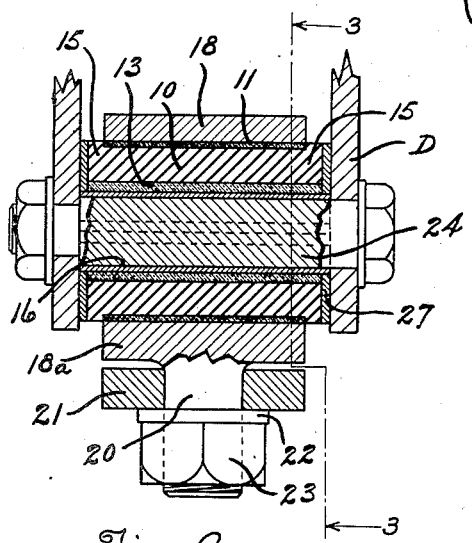
Fig. 2 is a section on the line 2—2 of Fig. 3, on an axial plane of a connecter made according to this invention, used to connect the front end of a leaf spring to the front end of a vehicle frame sill.
Figure 3:
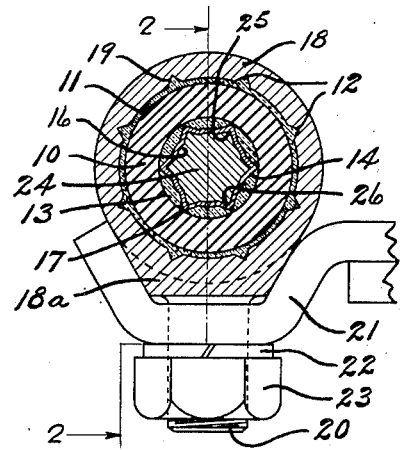
Fig. 3 is a section of the connecter shown in Fig. 2 on the line 3—3 of Fig. 2.

Referring to Figs. 2 and 3, 10 represents an annular mass of tough elastic vulcanizable material, such as rubber. At the outer surface of the mass 10 is a layer 11 of hard rubber or the like, provided on its exterior with ribs 12 extending, in the form shown, substantially parallel with the axis of the annulus. A layer 13, also of hard rubber or the like, lines the annulus 10 and in this hard material 13 may be formed grooves 14 which may be substantially parallel with the axis. It will be understood that the described masses 10, 11 and 13, are vulcanized into one integral body. The annulus or annular body therefore has external and internal surfaces that depart from a circular cylinder in contour.

Referring to Fig. 2, it will be observed that the hard layer 11 does not extend the full length axially of the connecter as does the layer 13. Between the edges of the layer 11 and the end of the annulus, there is a mass of soft elastic material 15 which may expand radially or otherwise.

Fitted within the central opening through the annulus is a metallic sleeve 16 provided externally with ribs 17 and internally with corresponding grooves 26. The ribs 17 correspond in number and shape with the grooves 14 formed in the hard layer 13. When, therefore, the sleeve 16 is inserted in the annulus, neither can rotate with respect to the other, since each similarly departs in contour from a circular cylinder.

Fitted over the annulus is a collar 18 having grooves 19 which correspond in number and form with the ribs 12 formed on the hard layer 11 of the described annulus. The collar 18 is of the same dimensions, measured axially, as that of the hard layer 11 and does not, therefore, extend over the soft end portions 15.

Lining sleeve 16 and collar 18 constitute internal and external elements which may move angularly with respect to each other only by the elastic yielding of the rubber or like mass of the annulus. These elements may be non-rotatively fastened to external parts as will presently appear.

At one side of the collar 18 there is a pyramidal projection 18a from which a threaded stud 20 extends. Said threaded stud, as shown in Figs. 2 and 3, is adapted to pass through an opening in one end of a leaf 21 of spring C and be secured thereto by means of a lock washer 22 and nut 23. As shown, the pyramidal projection 18a of the collar 18 fits a corresponding depression in the leaf spring thus forming an external very rigid connection between the collar and the spring.

In applying the device to the bracket D or the lower end of the links or shackle E, a ribbed bolt 24 is inserted in the lining sleeve 16 so that the ribs 25 thereof fit corresponding grooves 26 in the lining sleeve. By means of the same ribs or any other non-circular formation of the end parts of the bolt that enter correspondingly contoured openings in the bracket D or link E, the bolt may be secured non-rotatably to the said bracket or links. Said bolt may be held from longitudinal movement by lock washers and nuts as usual, and these nuts may be screwed so tightly as to prevent rotation of the bolt in the bracket or links without the necessity of any non-circular formation of the ends of the bolt and bolt holes if desired. Thus the bolt is unable to rotate either with respect to the bracket or links or with respect to the spring 17 or other external connected parts.

As illustrated in Fig. 2, washers or end plates 27 are locked non-rotatably to the ends of the lining sleeve 16 which may protrude from the ends of the annulus so that, in the construction shown, there will be room for expansion of the soft elastic mass of the annulus between said washers 27 and the hard layer 11 and collar 18. Thus any side thrust of the sprung or unsprung parts of a vehicle, transmitted to the spring, in the application illustrated, will be taken up and cushioned by an elastic mass.

Torsional movement of the joint will be permitted only by the elasticity of the rubber or other elastic substance, and all relative lateral movement of the connected parts, axially of the annulus, will be resisted, as described by the tough peripherally unconfined elastic mass at the ends of the annulus. Thus no metal portions of the respective connected parts come in contact to wear or rattle. No lubrication is necessary, and noise in the spring connecter or other jointed parts is substantially done away with.

An elastic connecter of the kind shown in Figs. 2 and 3 may be used for uniting the rear end of a front vehicle spring to the lower end of shackle or links E.

Figures 4, 5:
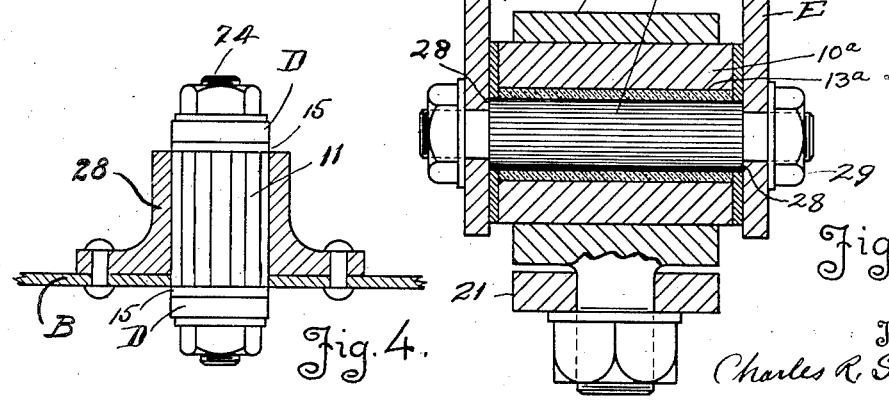
Fig. 4 is a longitudinal section through a vehicle sill on the line 4—4 of Fig. 1, showing how the connecter may be applied to a sill at the upper end of a spring shackle.
Fig. 5 is a section of a slightly modified form of connecter.

The connecter at the upper end of shackle or links E may be mounted in a sleeve 28 riveted to the inner face of the sill B, as shown in Fig. 4.

In the embodiments described thus far, the external collar 18 is rigidly and non-rotatably connected to one external part, namely a spring C, while the inner sleeve 16 is non-rotatably connected to another external part, namely the bracket D or shackle E. In Fig. 4, sleeve 28 takes the place of collar 18 and is fixed to the sill. As the resilient annulus is non-rotatably connected to both collar 18 (or bracket sleeve 28) and lining sleeve 16, relative angular movement of said collar or outer sleeve and lining sleeve, and also of the parts to which they in turn are non-rotatively connected, can take place only by the torsional yielding of the tough elastic mass of the annulus. Angular movement between the outer collar or sleeve and inner sleeve 16 is prevented because of the non-circular contour of the surfaces of annulus, inner sleeve and outer collar or sleeve. It will be obvious that the departure of these surfaces from a circle may be varied and numerous. The ribs and grooves shown in the drawings represent merely one approved contour selected and tested as suitable for the purpose.

In making the connecter a mass of relatively stiff rubber compound adapted to cure into a tough elastic body may be formed with a surrounding strip or ring and a central tube of hard rubber compound, placed in an appropriately formed annular die, compressed and cured in the manner known to those skilled in the art of rubber making. Lining sleeve and outer collar, of corresponding non-circular holding surfaces may then be assembled and the required connections made. Or, if desired, the lining sleeve 16 may be arranged in the mold as an insert, or said lining sleeve and outer collar may serve as mold parts in the process of forming and curing.

It has been found also that it is not always necessary to have the outer collar internally grooved to fit corresponding ribs on the rubber, or even to have the hard exterior layer 11, for the reason that the outer friction surfaces in contact are so large as to prevent the rubber from rotating in the collar. Unless the torsional strains, therefore, are very considerable the external ribs and grooves and even the external hard layer may be omitted.

In Fig. 5 there is shown a tough elastic annulus 10a having a lining layer 13a of hard rubber vulcanized to the tough rubber, said layer being devoid of inner grooves except as they are formed by the knurled bolt 24a when it is forced into the sleeve. In this figure the outer layer of hard rubber has been omitted, the annulus being held from rotation in the sleeve 18b by its considerable surface in close contact with the sleeve. Bolt 24a may have reduced ends forming shoulders 28 and links E may be so tightly clamped between the shoulders and the nuts 29 that the bolt cannot rotate with respect to the links, or whatever may be the external parts to which it may be desired to secure the bolt non-rotatively.

Although in accordance with the requirements of the patent law, the best embodiments of the invention now known have been described and illustrated, it is not intended that the scope of the invention shall be limited to the specific forms shown and described.

What is claimed and desired to be secured by Letters Patent is as follows:

1. In a resilient connecter, the combination of an elastic annulus having a body of tough rubber; a lining layer of hard rubber vulcanized thereto; an internal element of non-circular cross section engaging the lining layer; a member surrounding the annulus and engaging it non-rotatively; and external members fixed non-rotatively to said internal member and the member surrounding the annulus.

2. A device of the kind defined in claim 1 in which the lining layer is provided with alternating ribs and grooves engaging corresponding grooves and ribs of the internal element for preventing relative rotation of the annulus with respect to it.

3. A device of the kind defined in claim 1 in which the outer surface of the annulus is not engaged throughout its axial length by the member surrounding it whereby the rubber of the annulus is free to deform and elastically cushion movements of the external members axially of the annulus.

4. A device of the kind defined in claim 1 in which the member surrounding the annulus is a collar having a pyramidal formation at one side and a bolt projected therefrom for the purpose of engaging a corresponding opening in an external part.

5. In a resilient connecter, the combination of an elastic annulus having a body of tough vulcanizable material, an external layer and a lining layer of hard vulcanizable material, the external and internal peripheries respectively of which are non-circular in cross section; external and internal elements of corresponding internal and external contour engaging said external and internal non-circular peripheries and means whereby said elements may be non-rotatively secured to external parts adapted to have a relative angular movement with respect to each other.

6. A device of the kind defined in claim 5 in which said inner and outer layers are provided with alternating ribs and grooves engaging corresponding alternating grooves and ribs of the inner and outer engaging elements.

7. A device of the kind defined in claim 5 in which the outer hard layer is of less length than the body of the annulus leaving a circumferentially unconfined zone of soft elastic material at the ends.

8. A device of the kind defined in claim 5 in which the outer layer of hard material is of less length than the annulus leaving a circumferentially unconfined body of soft elastic material at the ends, and washers locked to the ends of the internal element.

9. A device of the kind defined in claim 5 in which a bolt extends through the center of the annulus and has a non-circular exterior adapted to prevent relative rotation between it and the annulus and which also passes through lateral supporting arms and holds the annulus against rotation with respect thereto.

10. A device of the kind defined in claim 5 in which the external element is a collar having a pyramidal formation at one side and a bolt projected therefrom for the purpose of engaging a corresponding opening in an external part.

11. In a resilient connecter, the combination of an annulus having a body of tough elastic vulcanizable material, an external layer and a lining layer of hard vulcanizable material, all vulcanized together, the external and internal peripheries being non-circular in cross section; a collar surrounding the annulus having a non-circular bore fitting the exterior surface of the annulus; a lining sleeve of non-circular section both internally and externally, fitting the interior of said annulus; a bolt of non-circular cross section, interengaging with said lining sleeve, and means for locking said bolt and said external collar non-rotatively to external parts.

In testimony whereof I hereto affix my signature.

CHARLES R. SHORT.